US007839721B1

(12) United States Patent
Clark

(10) Patent No.: US 7,839,721 B1
(45) Date of Patent: Nov. 23, 2010

(54) MODAL BEAM PROCESSING OF ACOUSTIC VECTOR SENSOR DATA

(75) Inventor: Joseph A. Clark, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 270 days.

(21) Appl. No.: 12/221,152

(22) Filed: Jul. 30, 2008

Related U.S. Application Data

(60) Provisional application No. 61/070,617, filed on Mar. 13, 2008.

(51) Int. Cl.
*H04B 1/06* (2006.01)

(52) U.S. Cl. ...................................... 367/135; 367/119

(58) Field of Classification Search ................. 367/135, 367/105, 119
See application file for complete search history.

(56) References Cited

U.S. PATENT DOCUMENTS 5,930,201 A * 7/1999 Cray .......................... 367/119
7,274,622 B1 * 9/2007 Huang et al. ................ 367/105

OTHER PUBLICATIONS

Joseph A. Clark; Rapid Communication High-order angular response beamformer for vector sensors; Journal of Sound and Vibration, vol. 318, Issue 3; Dec. 9, 2008; pp. 417-422.*

M. J. Berliner, J. F. Lindberg, Acoustic Particle Velocity Sensors: Design, Performance and Applications, /kiP, Woodbury, N.Y., 1996.*

G. L. D'Spain, W. S. Hodgkiss, G. L. Edmonds, "Energetics of the Deep Ocean's Infrasonic Sound Field," J. Acoust. Soc. Am., vol. 89, No. 3, pp. 1134-1158 (Mar. 1991).*

V. A. Shehurov, A.V. Shchurov, "Noise Immunity of a Combined Hydroacoustic Receiver," Acoustical Physics, vol. 48, No. 1, pp. 98-106 (Jan. 2002).*

B. A. Cray, A. H. Nuttall, "Directivity Factors for Linear Arrays of Velocity Sensors," J. Acoust. Soc. Am., vol. 110, No. 1, pp. 324-331 (Jul. 2001).*

A. Nehorai, E. Paldi, "Acoustic Vector-Sensor Array Processing," IEEE Trans. Sig. Proc., vol. 42, No. 9, pp. 2481-2491 (Sep. 1994).*

(Continued)

*Primary Examiner*—Dan Pihulic
(74) *Attorney, Agent, or Firm*—Howard Kaiser

(57) ABSTRACT

The present invention, as typically embodied, represents a novel methodology for effecting linear processing of output signals that are received from one or more acoustic vector sensors. First, as pertains to each modal beam, the modal beam amplitude response $b_{mn}$, is calculated as the matrix product of a data vector d and a modal weighting vector $w_{mn}$, wherein the weighting vector $w_{mn}$ is uniquely defined in terms of three different linear modal weighting vector equations corresponding to $w_{mnx}$, $w_{mny}$, and $w_{mnz}$, respectively. Second, as pertains to all of the modal beams, the directional beam amplitude response $b_{dirMN}$ is calculated as the sum of all of the individual modal beam amplitude responses $b_{mn}$. Because the inventive processing methodology is linear in nature (as distinguished from non-linear, e.g., quadratic, in nature), inventive practice is highly effective for performing quantitative acoustic measurements of sound fields.

6 Claims, 5 Drawing Sheets

OTHER PUBLICATIONS

M. Hawkes, A. Nehorai, "Acoustic Vector-Sensor Beamforming and Capon Direction Estimation," IEEE Trans. Sig. Proc., vol. 46, No. 9, pp. 2291-2304 (Sep. 1998).*

J. Meyer, G. Elko, "A Highly Scalable Microphone Array Based on an Orthonormal Decomposition of the Soundfield," ICASSP (May 13-17, 2002), pp. II-1781 to II-1784.*

H. Teutsch, W. Kellermann, "Acoustic Source Detection and Localization Based on Wavefield Decomposition Using Circular Microphone Arrays," J. Acoust. Soc. Am., vol. 120, No. 5, pp. 2724-2736 (Nov. 2006).*

H. Teutsch, W. Kellermann, "EB-ESPRIT: 2D Localization of Multiple Wideband Acoustic Sources Using Eigen-Beams," ICASSP (Mar. 18-23, 2005), pp. III-89 to III-92.*

J. A. Clark, G. Tarasek, "Localization of Radiating Sources along the Hull of a Submarine Using a Vector Sensor Array," Oceans '06, IEEE, Boston, MA, Sep. 18-21, 2006.*

K. B. Smith, A. V. van Leijen, "Steering Vector Sensor Array Elements with Linear Cardioids and NonLinear Hippioids," J. Acoust. Soc. Am., vol. 122, No. 1, pp. 370-377 (Jul. 2007).*

U.S. Appl. No. 61/070,617, filing date Mar. 13, 2008, invention title "Modal Beam Processing of Acoustic Vector Sensor Data," sole inventor Joseph A. Clark.

G. L. D'Spain, W. S. Hodgkiss, G. L. Edmonds, "Energetics of the Deep Ocean's Infrasonic Sound Field," *J. Acoust. Soc. Am.*, vol. 89, No. 3, Mar. 1991, pp. 1134-1158.

Benjamin A. Cray, Albert H. Nuttall, "Directivity Factors for Linear Arrays of Velocity Sensors," *J. Acoust. Soc. Am.*, vol. 110, No. 1, Jul. 2001, pp. 324-331.

Heinz Teutsch, Walter Kellermann, "Acoustic Source Detection and Localization Based on Wavefield Decomposition Using Circular Microphone Arrays, " *J. Acoust. Soc. A.*, vol. 120, No. 5, Nov. 2006, pp. 2724-2736.

Heinz Teutch, Walter Kellermann, "Eb-Espirit: 2D Localization of Multiple Wideband Acoustic Sources Using Eigen-Beams," 2005 International Conference on Acoustics, Speech, and Signal Processing (ICASSP 2005), IEEE, March 18-23, 2005, Philadelphia, Pennsylvania, vol. 3, pp. III-89 to III-92.

Joseph A. Clark, Gerald Tarasek, "Localization of Radiating Sources along the Hull of a Submarine Using a Vector Sensor Array," Oceans '06, IEEE, Boston, Massachusetts, Sep. 18-21, 2006 (3 pages).

Kevin B. Smith, A. Vincent van Leijen, "Steering Vector Sensor Array Elements with Linear Cardioids and Non-Linear Hippioids," *J. Acoust. Soc. Am.*,vol. 122, No. 1, Jul. 2007, pp. 370-377.

Robert Hickling, Wei Wei, Richard Raspet, "Finding the Direction of a Sound Source using a Vector Sound-Intensity Probe," *J. Acoust. Soc. Am*, vol. 94, No. 4, Oct. 1993, pp. 2408-2412.

Na Qi, Tan Tian, "Acoustic Vector Hydrophone Array Supergain Energy Flux Beamforming," Eighth International Conference on Signal Processing (ICSP '06), Nov. 16-20, 2006, Guillin, China (4 pages).

Joseph A. Clark and Gerald Tarasek, "Radiated Noise Measurements with Vector Sensor Arrays," 151$^{st}$ Meeting of the Acoustical Society of America, *J. Acoust. Soc. Am.*, vol. 119,. Number 5, Part 2, May 2006, p. 3444 (Abstract).

Joseph A. Clark and Gerald Tarasek, "Localization with Vector Sensors in Inhomogeneous Media," 153 $^{rd}$ Meeting of the Acoustical Society of America, *J. Acoust. Soc. Am.*, vol. 121, No. 5, Part 2, May 2007, p. 3070 (Abstract).

Joseph A. Clark, "Enhancing Underwater Acoustic Vector Sensor Measurement Performance by Point Source Analysis," 154$^{rd}$ Meeting of the Acoustical Society of America, *J. Acoust. Soc. Am.*, vol. 122, No. 5, Part 2, Nov. 2007, p. 3010 (Abstract).

Joseph A. Clark and Dehua Huang, "High Resolution Angular Measurements with Single Vector Sensors and Arrays," Acoustics '08 Paris, *J. Acoust. Soc. Am.*, vol. 123, No. 5, Part 2, May 2008, p. 3006 (Abstract).

Joseph A. Clark, "Calibration of Vector Sensors," Acoustics '08 Paris, *J. Acoust. Soc. Am.*, vol. 123, No. 5, Part 2, May 2008, p. 3347 (Abstract).

* cited by examiner horizontal plane vertical plane

MODAL BEAM PROCESSING OF ACOUSTIC VECTOR SENSOR DATA

CROSS-REFERENCE TO RELATED APPLICATIONS

This application claims the benefit of U.S. provisional patent application Ser. No. 61/070,617, hereby incorporated herein by reference, filing date 13 Mar. 2008, invention title "Modal Beam Processing of Acoustic Vector Sensor Data," sole inventor Joseph A. Clark.

BACKGROUND OF THE INVENTION

The present invention relates to acoustics, more particularly to methods and systems for using acoustic sensors or acoustic sensor information to ascertain characteristics of sources of sound.

An acoustic "scalar" sensor measures a scalar component of an acoustic field, such as pressure. As distinguished from an acoustic scalar sensor, an acoustic "vector" sensor measures a vector (non-scalar) component of an acoustic field, such as particle velocity. A typical acoustic vector sensor includes both a scalar component (e.g., pressure) and a vector component (e.g., particle velocity) of an acoustic field. More specifically, a typical underwater acoustic vector sensor combines a tri-axial arrangement of motion-sensing devices (such as accelerometers or other wave/particle-velocity sensors) with a pressure-sensing hydrophone, in a neutrally buoyant package smaller than half a wavelength; see M. J. Berliner, J. F. Lindberg, *Acoustic Particle Velocity Sensors: Design, Performance and Applications,* AIP, Woodbury, N.Y., 1996, incorporated herein by reference. The vector sensors are used alone or in arrays to detect and localize sources of sound; see G. L. D'Spain, W. S. Hodgkiss, G. L. Edmonds, "Energetics of the Deep Ocean's Infrasonic Sound Field," J. *Acoust. Soc. Am.,* Volume 89, Number 3, pages 1134-1158 (March 1991), incorporated herein by reference; V. A. Shchurov, A. V. Shchurov, "Noise Immunity of a Combined Hydroacoustic Receiver," *Acoustical Physics,* Volume 48, Number 1, pages 98-106 (January 2002), incorporated herein by reference; Benjamin A. Cray, "Acoustic Vector Sensing Sonar System," U.S. Pat. No. 5,930,201, issue date 27 Jul. 1999, incorporated herein by reference.

Analytical models of vector sensor measurement systems have been developed to evaluate their detection performance (see B. A. Cray, A. H. Nuttall, "Directivity Factors for Linear Arrays of Velocity Sensors," *J. Acoust. Soc. Am.,* Volume 110, Number 1, pages 324-331 (July 2001), incorporated herein by reference) and their localization performance (see A. Nehorai, E. Paldi, "Acoustic Vector-Sensor Array Processing," *IEEE Trans. Sig. Proc.,* Volume 42, Number 9, pages 2481-2491 (September 1994), incorporated herein by reference; M. Hawkes, A. Nehorai, "Acoustic Vector-Sensor Beamforming and Capon Direction Estimation," *IEEE Trans. Sig. Proc.,* Volume 46, Number 9, pages 2291-2304 (September 1998), incorporated herein by reference). Generally speaking, acoustic sensor systems that effect conventional signal processing and implement vector sensors afford better sensitivity and resolution than do similar systems that implement scalar sensors.

Scalar modal beam processing was recently introduced as a processing scheme for spherical arrays of microphones (see J. Meyer, G. Elko, "A Highly Scalable Microphone Array Based on an Orthonormal Decomposition of the Soundfield," ICASSP (13-17 May 2002), pages II-1781 to II-1784, incorporated herein by reference) and for circular arrays of microphones (see H. Teutsch, W. Kellermann, "Acoustic Source Detection and Localization Based on Wavefield Decomposition Using Circular Microphone Arrays," *J. Acoust. Soc. Am.,* Volume 120, Number 5, pages 2724-2736 (November 2006), incorporated herein by reference; H. Teutsch, W. Kellermann, "EB-ESPIRIT: 2D Localization of Multiple Wideband Acoustic Sources Using Eigen-Beams," ICASSP (18-23 March 2005), pages III-89 to III-92, incorporated herein by reference). Rather than directly beamforming an array of signals, basically the following two-step process is used according to the aforementioned scalar modal beam processing: First, spherical or cylindrical modal beams are formed by suitably weighted sums of signals from a scalar sensor array. Second, the modal beams are then combined to form one or more computationally steerable directive beams. Scalar modal beam processing is limitedly effective, however, because the number of modal beams that can be formed from scalar array data is restricted to a few low-order modes by the number of sensors in the array, by the radius of the array, and by large differences in sensitivities of the computed mode; see J. Meyer et al., supra.

Non-linear beam-forming schemes have recently been reported; see J. A. Clark, G. Tarasek, "Localization of Radiating Sources along the Hull of a Submarine Using a Vector Sensor Array," Oceans '06, IEEE, Boston, Mass., 18-21 Sep. 2006, incorporated herein by reference; K. B. Smith, A. V. van Leijen, "Steering Vector Sensor Array Elements with Linear Cardioids and Non-Linear Hippioids," *J. Acoust. Soc. Am.,* Volume 122, Number 1, pages 370-377 (July 2007), incorporated herein by reference; Dehua Huang et al., "Nonlinear Techniques for Pressure Vector Acoustic Sensor Array Synthesis," U.S. Pat. No. 7,274,622 B1, issue date 25 Sep. 2007, incorporated herein by reference. Non-linear processing methods can further improve resolution; however, calibration is difficult of the output of measurement systems employing non-linear processing methods. Therefore, the use of non-linear processing methodology is often limited to qualitative indications of the sound field characteristics.

SUMMARY OF THE INVENTION

In view of the foregoing, it is an object of the present invention to provide an improved methodology for performing quantitative acoustic measurements of sound fields.

The present invention provides a new method for processing data from acoustic vector sensors. The term "acoustic vector sensor," as used herein, refers to an acoustic sensing device that includes at least one vector sensing component; under this broad definition, an acoustic vector sensor can include, but does not necessarily include, at least one scalar sensing component. The inventive method is a completely linear method of processing data from acoustic vector sensors. The present inventor has other inventions that are related to the present invention. In particular, the present inventor has invented non-linear methods for resolving images of sound fields, and for using such information in underwater acoustic measurement systems to localize sound sources. The present inventor's novel linear processing methodology, disclosed herein, achieves improvements in resolution akin to those achieved by the present inventor's novel non-linear super-resolution processing methodologies.

In accordance with typical embodiments of the present invention's method for processing data from acoustic vector sensors: First, multiple orders of horizontal and vertical modal response beams are computed with data from each vector sensor. Second, the modal response beams are summed with appropriate phasing to form directive beams in selected directions. The inventive method represents what the present inventor refers to herein as a "two-step" processing method, as distinguished from a method involving directly forming a response beam in a selected direction. According to typical inventive practice, highly super-directive beams can be formed, even with a single vector sensor. The present invention's modal beams are well adapted for ambient noise discrimination because they are statistically independent. Featured, inter alfa, by the present invention is its unique two-step processing approach, which advantageously enables the present invention's method to remain linear. Since the inventive method is linear, it can be used to perform quantitative acoustic measurements of sound fields. The present invention represents, in a sense, a novel beamforming methodology—one possessing greater potential for measurability and applicability than do conventional beamforming methodologies.

As the present invention is typically embodied, a method for processing output from at least one acoustic vector sensor includes: (i) calculating the modal beam amplitude response ($b_{mn}(\theta,\phi,\theta_1,\phi_1)$) for each of plural modal beams; and, (ii) calculating the directional beam amplitude response ($b_{dirMn}$) for all of the modal beams. The calculating of the modal beam amplitude response includes using the matrix-product equation $b_{mn}=w_{mn}^{\dagger}d$ , where d is the data vector representing signals from the at least one acoustic vector sensor, (m) is the vertical order of each said modal beam amplitude response, (n) is the horizontal order of each said modal beam amplitude response, and $w_{mn}(\theta,\phi,\theta_1,\phi_1)$ is the following set of modal weighting vectors:

$$w_{mnx}=\cos(m\theta-(m-1)\theta_1)\cos(n\phi-(n-1)\phi_1)$$

$$w_{mny}=\cos(m\theta-(m-1)\theta_1)\sin(n\phi-(n-1)\phi_1)$$

$$w_{mnz}=\sin(m\theta-(m-1)\theta_1.$$

The calculating of the directional beam amplitude response includes using the summation equation $$b_{dirMN}=\sum_{mn}b_{mn},$$

where $b_{dirMN}$ is the sum of all of the modal beam amplitude responses up to a selected maximum vertical order (M) and a selected maximum horizontal order (N).

According to some inventive embodiments, the inventive method further comprises: (iii) calculating the modal beam intensity response ($I_{mn}$) ; and (iv) calculating the directional beam intensity response ($I_{dirMN}$) . The calculating of the modal beam intensity response includes using the absolute-value-squared equation $I_{mn}=|b_m|^2$. The calculating of the directional beam intensity response includes using the absolute-value-squared equation $I_{dirMN}=|b_{dirMN}|^2$.

Inventive practice frequently provides for an inventive computer program product for residence in a computer's memory. The inventive computer program product includes a computer useable medium having computer program logic recorded thereon. The inventive computer program logic is embodied in computer code for enabling the computer to inventively process output from at least one acoustic vector sensor.

Two-step processing methods have been previously considered in acoustic signal processing of signals from arrays of scalar sensors (e.g., microphones); however, a two-step processing method has never been known in association with vector sensors. The present invention's completely linear method for processing data from vector sensors is new. The inventive method has been demonstrated by numerical computations of both modal beam pattern responses and directive beam pattern responses, to a plane wave incident from various directions. The present invention uniquely renders great and fundamental modifications of basic two-step processing ideas that are known in association with scalar sensors, the present invention thereby uniquely adapting these basic ideas to vector sensors. The present invention's vector sensor measurement methodology thus bears some analogy to a scalar modal processing scheme. As typically embodied, the present invention provides a two-step method of modal beam processing for vector sensor measurement systems. The inventive method is novel in its two-step processing strategy, according to which (1) modal response beams are formed, and (2) these beams are summed to form highly resolved images of the sound field.

Among other novel features and advantages of the present invention are its potentiality for replacing the pressure sensor component in vector sensors with a signal derived just from the accelerometers, and its potentiality for a physically unbounded number of available modal beams. Only a few lower-order modal beams have been produced by previous two-step modal processing methods. The present invention is practiced in association with vector sensors, rather than scalar sensors. A vector sensor, in and of itself, can be advantageous vis-á-vis a scalar sensor, as a vector sensor can be electrically steered in any direction around its origin; hence, a single vector sensor can generate data equivalent to the data generated by an entire circular or spherical microphone array. Furthermore, the present inventor has determined that there are no apparent physical restrictions on the number of higher order modal beams that can be formed using vector sensors in accordance with the inventive methodology.

The inventive modal beam processing method can be used with underwater acoustic vector sensors that either do or do not include a pressure sensor. Moreover, the inventive modal beam processing method can be used with acoustic vector sensors designed to work in air. The inventive method can also be used with either in-air or underwater vector acoustic intensity probes. These probes include four pressure sensors in a tri-axial arrangement that produces sum and difference signals, which indirectly determine the acoustic particle velocity. See R. Hickling, W. Wei, R. Raspet, "Finding the Direction of a Sound Source Using a Vector Sound-Intensity Probe," *J. Acoust. Soc. Am.,* Volume 94, Number 4, pages 2408-2412 (October 1993), incorporated herein by reference.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 2 shows the zero-order mode ($IL_{00}$). FIG. 3 shows the $1^{st}$-order vertical mode ($IL_{10}$). FIG. 4 shows the $1^{st}$-order horizontal mode ($IL_{01}$). FIG. 5 shows the $1^{st}$ order cross mode ($IL_{11}$).

FIG. 6 shows a 3-D display. FIG. 7 shows a slice in vertical plane. FIG. 8 shows a slice in horizontal plane. FIG. 9 shows an image of a beam pattern illustrating 3 dB contours.

FIG. 10 shows a 3-D display. FIG. 11 shows a 2-D slice of a beam steered 20 degrees in horizontal plane. FIG. 12 shows a 3-D display. FIG. 13 shows a 2-D slice of a beam steered 20 degrees in vertical plane.

FIG. 14 shows a 3-D display. FIG. 15 shows a 2-D slice of a beam steered 20 degrees in horizontal plane. FIG. 16 shows a 3-D display. FIG. 17 shows a 2-D slice of a beam steered 20 degrees in vertical plane.

DESCRIPTION OF EXEMPLARY EMBODIMENTS OF THE INVENTION

Inventive Modal Beam Processing Algorithm

Figure 1:
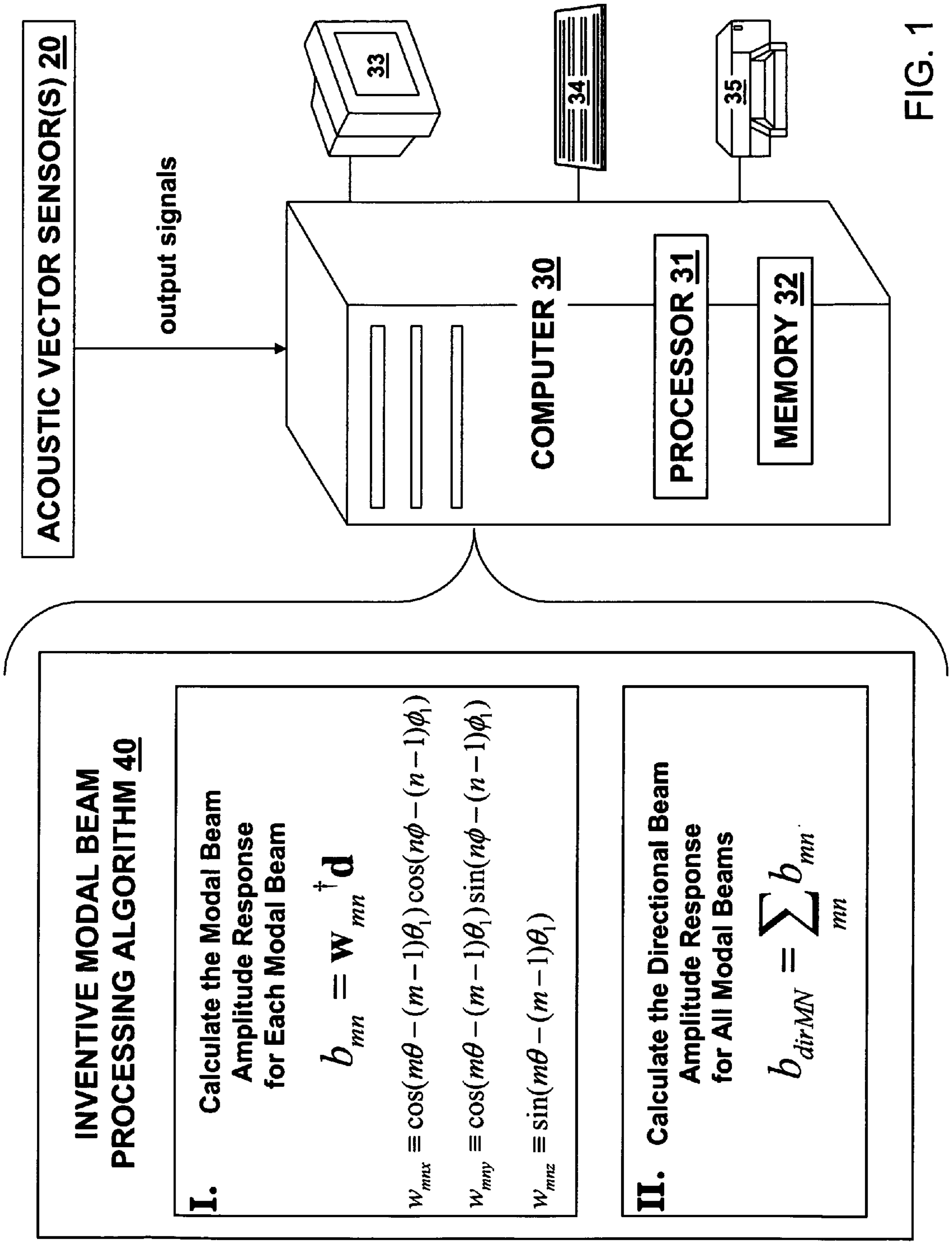
FIG. 1 is a schematic of an embodiment of practice of a modal beam processing algorithm in accordance with the present invention.

The amplitude response (b) of a measurement system composed of a set of sensors to an arbitrary wavefield can be expressed as the matrix product of a transposed weighting vector (w) and a data vector (d): $b=w^{\dagger}d$ , where (†) indicates the transpose of a vector; see B. A. Cray et al., supra. The elements of the data vector ($d_i$) represent signals from each element (i) of a sensor array. The intensity response (I) of the system is $I=|b|^2$. The intensity response as a function of the look directions $(\theta,\phi)$ is usually presented in relative intensity levels $(IL(\theta,\phi))$, where $IL=10\cdot\log_{10}(I/I_0)$ and $(I_0)$ is the maximum value of $(I(\theta,\phi))$.

In the instant disclosure, $(\theta,\phi)$ are defined in spherical coordinates defined in a right-handed Cartesian coordinate system as the angle $(\theta)$ from the horizontal (x,y) plane towards the vertical (z) axis and the angle $(\phi)$ in the horizontal plane from the (x) axis towards the (y) axis.

The amplitude responses of the triaxial accelerometers in a single vector sensor to a plane wave of unit amplitude from a direction $(\theta_1,\phi_1)$ form the components of a data vector $(d(\theta_1, \phi_1))$:

$$d_x=\cos(\theta_1)\cos(\phi_1)$$

$$d_y=\cos(\theta_1)\sin(\phi_1)$$

$$d_z=\sin(\theta_1) \tag{1}$$

Only a single vector sensor is explicitly considered in this example of vector sensor measurement processing in accordance with the present invention. Furthermore, data from the pressure sensor component in the vector sensor is suppressed in this inventive example. Inventive processing characterized by these simplifications is described herein to emphasize that results can be inventively obtained with only the vector (e.g., accelerometer) components of a single vector sensor. It is straightforward to the ordinarily skilled artisan who reads the instant disclosure how the present invention can be practiced so as to include the responses of both (i) a pressure sensor and (ii) one or more (e.g., an array of) vector sensors.

The weighting vector used in conventional linear processing schemes for vector sensor data has a form similar to that of the plane wave data vector. For the case of a single vector sensor (with the pressure data suppressed), the form of the weighting vector $(w(\theta,\phi))$ is:

$$w_x=\cos(\theta)\cos(\phi)$$

$$w_y=\cos(\theta)\sin(\phi)$$

$$w_z=\sin(\theta). \tag{2}$$

See, e.g., the aforementioned Cray U.S. Pat. No. 5,930,201. Beam pattern responses are obtained by solving the beamforming equations for a set of look directions $(\theta,\phi)$ distributed with some resolution size over the entire surface of a unit sphere.

In accordance with typical practice of the present invention, modal beam pattern responses for a single vector sensor are computed by defining a new set of modal weighting vectors $w_{mn}(\theta,\phi,\theta_1,\phi_1)$, where (m) and (n) characterize the vertical and horizontal orders, respectively, of the modal beam responses. The components of the modal weighting vectors are defined as:

$$w_{mnx}\equiv\cos(m\theta-(m-1)\theta_1)\cos(n\phi-(n-1)\phi_1)$$

$$w_{mny}\equiv\cos(m\theta-(m-1)\theta_1)\sin(n\phi-(n-1)\phi_1)$$

$$w_{mnz}\equiv\sin(m\theta-(m-1)\theta_1). \tag{3}$$

The first step of the present invention's modal beam processing algorithm computes the amplitude response $(b_{mn}(\theta, \phi,\theta_1,\phi_1))$ of each modal beam via the matrix equation $b_{mn}=w_{mn}^{\dagger}d$. The modal beam intensity response $(I_{mn})$ is $I_{mn}=|b_{mn}|^2$. Beam patterns are obtained by solving the modal beam-forming equation for each look direction $(\theta, \phi)$.

The second step of the inventive algorithm computes the directional beam amplitude response $(b_{dirMN})$ as the (linear) sum of all the modal beam amplitude responses up to selected maximum orders (M,N):

$$b_{dirMN}=\sum_{mn} b_{mn}. \tag{4}$$

The directional beam intensity response $(I_{dirMN})$ is $I_{dirMN}=|b_{dirMN}|^2$. The additional factors dependent on the incident wave direction $(\theta_1,\phi_1)$ in equations (3) adjust the phases of the modal beam patterns so that they superpose to form a directive beam in the selected direction. Thus, as further discussed hereinbelow, some a priori information about the incident wavefield is assumed by the inventive algorithm.

Referring now to FIG. 1, a computer system, such as including a computer processing means and peripherals, can be electrically connected to the acoustic vector sensor or sensors 20. As shown by way of example in FIG. 1, computer 30 includes a processor 31 and memory 32. A display 33, an interface (e.g., including keyboard and mouse) 34 and a printer 35 are connected to computer 30. The present invention's modal beam processing algorithmic computer program product 40 is resident in memory 32, has computer program logic recorded therein, and is embodied in computer code, The inventive computer program product enables computer 30 to perform inventive processing of the output signals that are received from the one or more acoustic vector sensors 20.

Modal and Directive Beam Pattern Responses

The present inventor has demonstrated his inventive method through numerical computations of the responses of a measurement system composed of a single vector sensor to a plane wave of unit amplitude from a selected direction. Both the individual modal beam pattern responses and the directive beam pattern responses, obtained by linearly combining modal beams in accordance with the present invention, are discussed hereinbelow and are shown in the drawings. As the present invention is typically practiced, the modal beam responses are statistically independent because they each correspond to a unique summation of an isotropic noise field. This inventive feature could have significant favorable implications for the ability of vector sensor measurement systems to operate in low signal-to-noise environmental conditions.

With reference to FIG. 2 through FIG. 5, sets of modal beam responses can be generated by the inventive processing algorithm. Moreover, vertical, horizontal and cross-modal beam sets can be identified by the inventive processing algorithm. The number of modal beams that can be practically realized by the present invention appears to be limited only by the computational power available. Beam patterns for the lowest-order modal responses of a single vector sensor are presented in FIG. 2 through FIG. 5. The beam patterns are presented in FIG. 2 through FIG. 5 as relative intensity levels constrained to a 20 dB dynamic range, and are computed for the case of a plane wave incident from the direction (θ=0°, ϕ=0°) unless otherwise noted.

Figure 2:
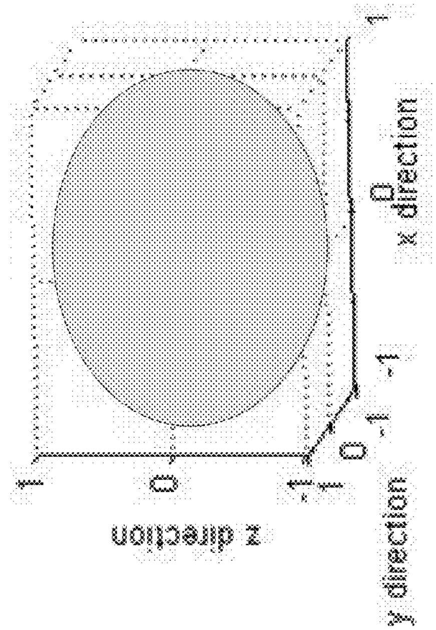
FIG. 2 through FIG. 5 are graphical representations, in accordance with the present invention, of modal beam patterns obtained by lowest-order processing of vector sensor data.

FIG. 2 shows the zero-order modal beam response ($IL_{00}$), which is seen to be omni-directional. In some cases the zero-order modal beam response ($IL_{00}$) is equivalent to the response of the pressure sensor in a vector sensor package, a surprising result. This unusual appearance of an equivalence between pressure sensor measurements and velocity sensor measurements suggests that an inverse case might also be possible in inventive practice; that is, as an alternative, the present invention's vector modal processing method can be employed with a steerable system of scalar sensors, such as that used in vector intensity probes as disclosed by the aforementioned R. Hickling et al. Thus, in accordance with inventive practice, a new zero-order response mode for vector sensor measurement systems has been identified. This response mode is equivalent to that of the pressure sensor normally included in a vector sensor package, and could be used under some conditions (e.g., linear acoustic wave field) to replace the pressure sensor; nevertheless, if other velocity fields are also present (e.g., turbulence), it could be advantageous to employ both pressure sensors and vector sensors.

Figure 3:
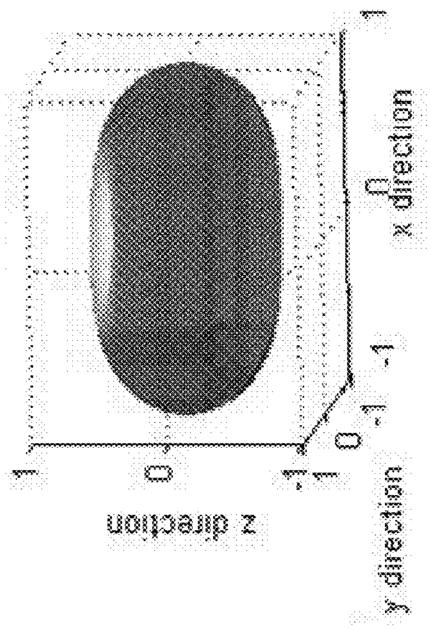
Figure 4:
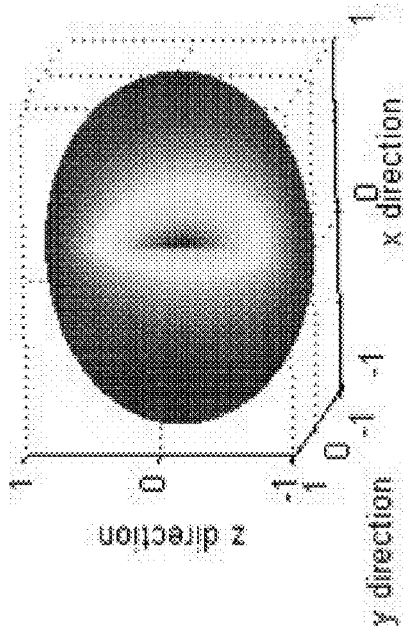
Figure 5:
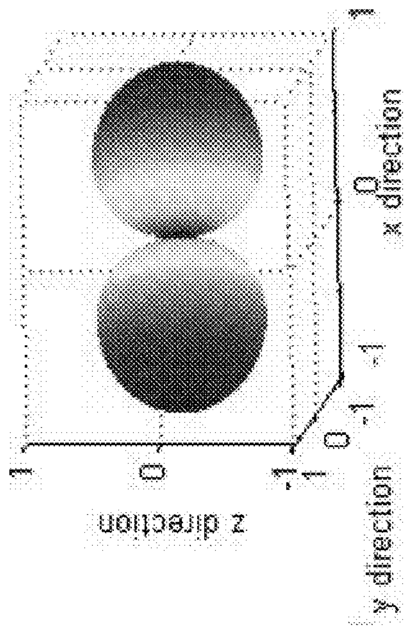

Horizontal, vertical and cross modal sets of beams can be distinguished in the coordinate system specified herein. The first-order vertical modal beam pattern ($IL_{10}$) has a doughnut shape, as illustrated in FIG. 3. The first-order horizontal mode ($IL_{01}$) is shown in FIG. 4. FIG. 5 depicts the first order cross mode ($IL_{11}$), which is seen to correspond to the dipole response expected to be observed from a particle motion sensor oriented in the (x) direction.

Reference is now made to FIG. 6 through FIG. 9, FIG. 10 through FIG. 13, and FIG. 14 through FIG. 17, which illustrate various directive beam patterns generated in accordance with the present invention. These examples of inventive practice give indications that the beamwidth and directivity of the directive beam patterns improve with increase in the directive beam order; furthermore, these increases in beamwidth and directivity appear to be physically unbounded.

Several orders ($1^{st}$, $4^{th}$, $20^{th}$) of directive beam responses to a plane wave incident on the sensor package from various directions have been demonstrated by the present inventor. Some a priori knowledge of the incident wave direction is required by the inventive algorithm. In this regard, it has been shown by the aforementioned Hawkes et al. that incident wave direction information can be obtained from a singular value decomposition of a matrix formed from the data vector. Hawkes et al. also suggest that it should be possible to simultaneously resolve several incident plane waves, if they are statistically independent.

Figure 6:
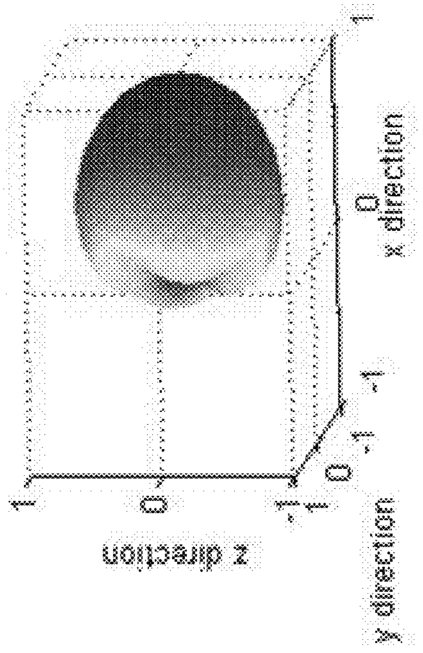
FIG. 6 through FIG. 9 are graphical representations, in accordance with the present invention, of the $1^{st}$-order directive beam pattern obtained by summing the modal beams shown in FIG. 2 through FIG. 5.
Figure 7:
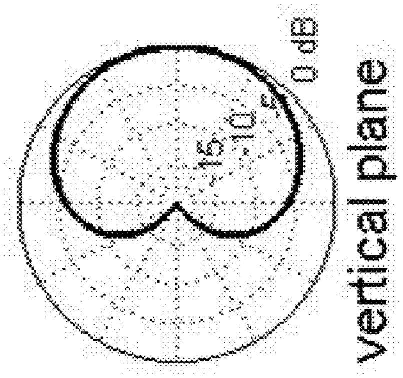
Figure 8:
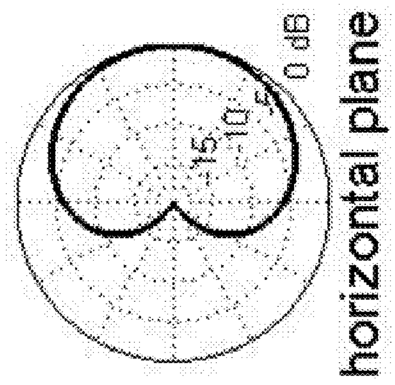
Figure 9:
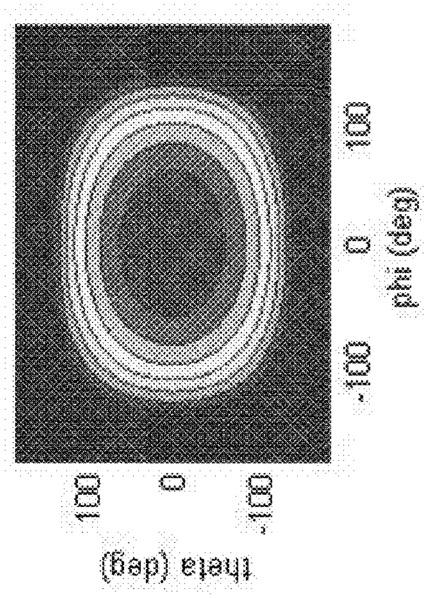

FIG. 6 through FIG. 9 portray the directive beam pattern produced by linearly summing the amplitudes of the four modal beams shown in FIG. 2 through FIG. 5. In FIG. 6 through FIG. 9, the beam pattern is displayed four ways to identify significant features of the first-order directive beam ($IL_{dir11}$). FIG. 6 is a 3-D perspective view. The pattern is seen to be similar to the well-known cardioid beam pattern, but closes in a uniquely Cartesian manner in the aft direction. However, 2-D vertical and horizontal slices through the beam pattern (illustrated in FIG. 7 and FIG. 8, respectively) still show the characteristic cardioid shape. FIG. 9 shows the response as an image of the incident plane wave quantified by 3 dB contours, and the beamwidth in degrees is easily estimated from this display.

Figure 11:
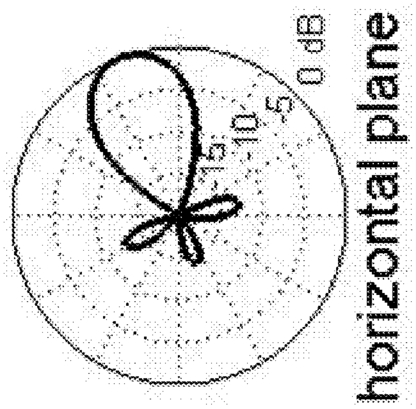
FIG. 10 through FIG. 13 are graphical representations, in accordance with the present invention, of $4^{th}$-order directive beam patterns illustrating decreasing beamwidth with higher orders and effects of beam steering.
Figure 13:
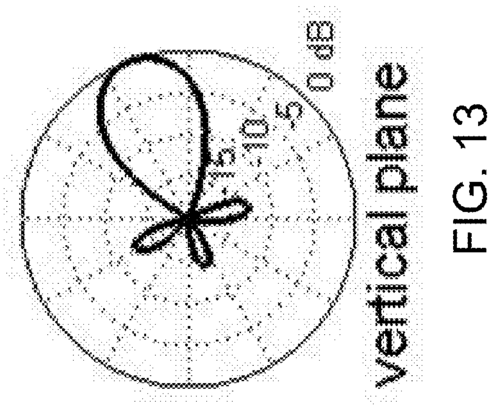
Figure 10:
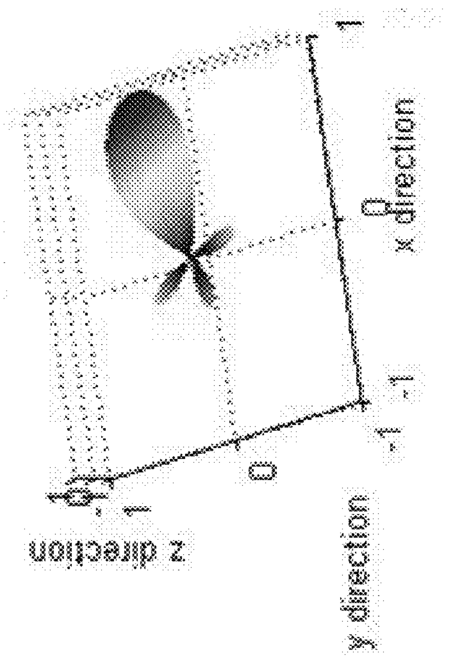
Figure 12:
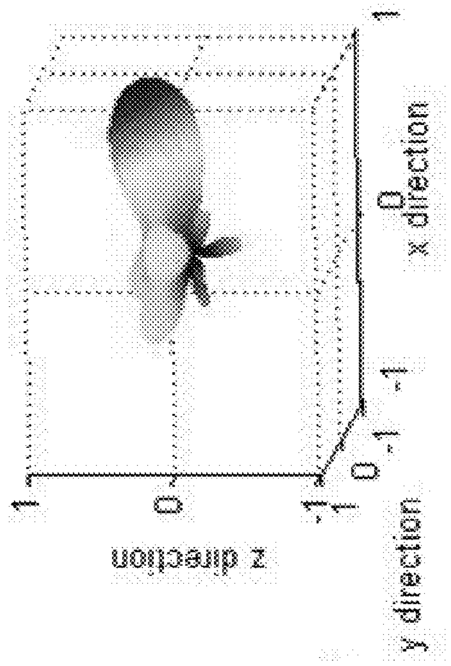
Figure 14:
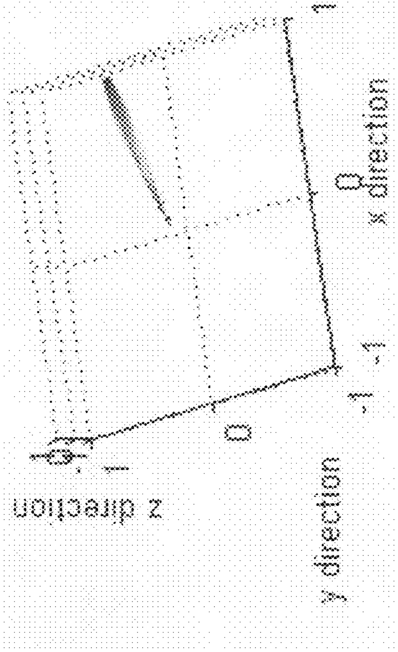
FIG. 14 through FIG. 17 are graphical representations, in accordance with the present invention, of $20^{th}$-order directive beam patterns illustrating decreasing beamwidth with higher orders and effects of beam steering.
Figure 15:
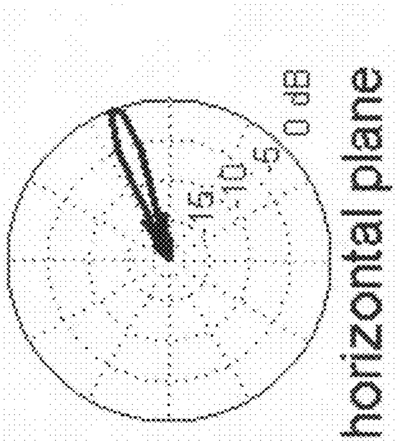

FIG. 10 through FIG. 13 present a study of a selected higher-order directive beam—viz., the $4^{th}$-order directive beam ($IL_{dir44}$)—and illustrate effects of steering the $4^{th}$-order directive beam. FIG. 10 is a 3-D view of the fourth-order directive beam steered 20 degrees off-axis horizontally. FIG. 11 shows a horizontal slice through the same fourth-order directive beam. The main lobe of the fourth-order directive beam pattern is clearly seen to have a narrower beamwidth than has the first-order directive beam. Some side lobe structure becomes visible in the higher-order beam pattern. It has been observed by the present inventor that the beam pattern rotates rigidly (without distortion) throughout the horizontal plane. FIG. 12 and FIG. 13 are corresponding views obtained by steering the fourth-order directive beam 20 degrees vertically. The patterns reveal that some change in the shape of the side lobes occurs as the fourth-order directive beam is steered vertically, although no distortions are apparent in the vertical slice of the beam. The present inventor has found that the main lobe of the fourth-order directive beam—as characterized by the vertical slice—also does not deform throughout the entire range of vertical angles.

Figure 16:
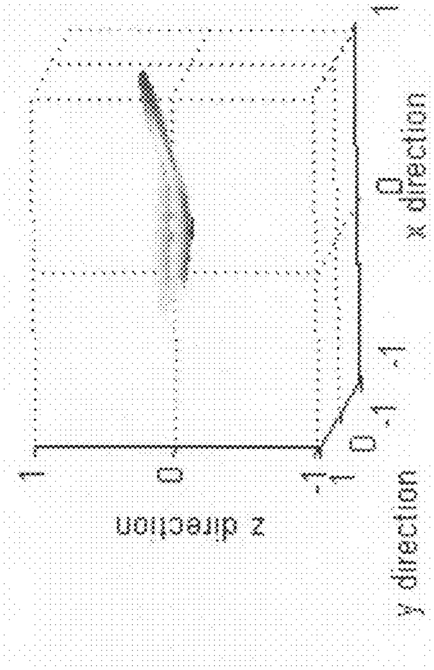
Figure 17:
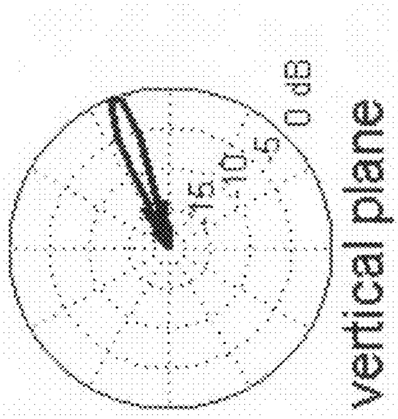

FIG. 14 through FIG. 17 present a study of a still higher-order directive beam, viz., the $20^{th}$-order directive beam ($IL_{dir2020}$). The effects of steering are again illustrated in FIG. 14 through FIG. 17. The twentieth-order directive beam patterns show the response of a vector sensor to a plane wave incident from 20 degrees off-axis—either horizontally (FIG. 14 and FIG. 15) or vertically (FIG. 16 and FIG. 17). FIG. 14 through FIG. 17 demonstrate that the beam pattern continues to become more highly directive as the order is increased. Some distortion of the smooth beam shape is observed because the beamwidth is approaching the resolution size of the (100×100) point grid chosen for these computations. This is a factor that can be improved until the limits of computational power are reached. It is again found that the beams show no evidence of distortion as they are rotated in the horizontal plane. Some side lobe structure is observed as the beams are rotated vertically; however, the side lobe structure becomes smaller with higher directive beam order, and is not observed in the main lobe as characterized by the 2-D vertical slice of the beam pattern.

As noted hereinabove with reference to FIG. 10 through FIG. 13 and FIG. 14 through FIG. 17, some undesirable side lobe structures are observed if the vector sensor is steered vertically. While these effects appear to be negligible for higher-order directive beams in the vertical steering directions in the range between ±20°, the directivity of the system could be seriously degraded by the side lobes outside of this range.

The present invention, which is disclosed herein, is not to be limited by the embodiments described or illustrated herein, which are given by way of example and not of limitation. Other embodiments of the present inventions will be apparent to those skilled in the art from a consideration of the instant disclosure or from practice of the present invention. Various omissions, modifications and changes to the principles disclosed herein may be made by one skilled in the art without departing from the true scope and spirit of the present invention.

What is claimed is:

1. A method for processing output from at least one acoustic vector sensor, the method comprising:

calculating the modal beam amplitude response ($b_{mn}(\theta,\phi,\theta_1,\phi_1)$) for each of plural modal beams, said calculating of the modal beam amplitude response including using the matrix-product equation $b_{mn}=w_{mn}{\dagger}d$, wherein d is the data vector representing signals from said at least one acoustic vector sensor, (m) is the vertical order of each said modal beam amplitude response, (n) is the horizontal order of each said modal beam amplitude response, and $w_{mn}(\theta,\phi,\theta_1,\phi_1)$ is the following set of modal weighting vectors:

$$w_{mnx}=\cos(m\theta-(m-1)\theta_1)\cos(n\phi-(n-1)\phi_1)$$

$$w_{mny}=\cos(m\theta-(m-1)\theta_1)\sin(n\phi-(n-1)\phi_1)$$

$$w_{mnz}=\sin(m\theta-(m-1)\theta_1:$$

calculating the directional beam amplitude response ($b_{dirMN}$) for all of said modal beams, said calculating of the directional beam amplitude response including using the summation equation $$b_{dirMN}=\sum_{mn} b_{mn},$$

wherein $b_{dirMN}$ is the sum of all said modal beam amplitude responses up to selected maximum vertical order (M) and selected maximum horizontal order (N).

2. The method of claim 1, the method further comprising:

calculating the modal beam intensity response ($I_{mn}$), said calculating of the modal beam intensity response including using the absolute-value-squared equation $I_{mn}=|b_{mn}|^2$;

calculating the directional beam intensity response ($I_{dirMN}$), said calculating of the directional beam intensity response including using the absolute-value-squared equation $I_{dirMN}=|b_{dirMN}|^2$.

3. A computer program product for residence in memory of a computer, the computer program product comprising a computer useable medium having computer program logic recorded thereon, said computer program logic being embodied in computer code for enabling said computer to process output from at least one acoustic vector sensor, said enabling of said processing including:

enabling of said computer to calculate the modal beam amplitude response ($b_{mn}(\theta,\phi,\theta_1,\phi_1)$ for each of plural modal beams, said calculating of the modal beam amplitude response including using the matrix-product equation $b_{mn}=w_{mn}^{\dagger}d$, wherein d is the data vector representing signals from said at least one acoustic vector sensor, (m) is the vertical order of each said modal beam amplitude response, (n) is the horizontal order of each said modal beam amplitude response, and $w_{mn}(\theta,\phi,\theta_1,\phi_1)$ is the following set of modal weighting vectors:

$$w_{mnx}=\cos(m\theta-(m-1)\theta_1)\cos(n\phi-(n-1)\phi_1)$$

$$w_{mny}=\cos(m\theta-(m-1)\theta_1)\sin(n\phi-(n-1)\phi_1)$$

$$w_{mnz}=\sin(m\theta-(m-1)\theta_1)$$

enabling of said computer to calculate the directional beam amplitude response ($b_{dirMN}$) for all of said modal beams, said calculating of the directional beam amplitude response including using the summation equation $$b_{dirMN}=\sum_{mn} b_{mn},$$

wherein $b_{dirMN}$ is the sum of all said modal beam amplitude responses up to selected maximum vertical order (M) and selected maximum horizontal order (N).

4. The computer program product of claim 3, said enabling of said processing further including:

enabling of said computer to calculate the modal beam intensity response ($I_{mn}$), said calculating of the modal beam intensity response including using the absolute-value-squared equation $I_{mn}=|b_{mn}|^2$;

enabling of said computer to calculate the directional beam intensity response ($I_{dirMN}$), said calculating of the directional beam intensity response including using the absolute-value-squared equation $I_{dirMN}=|b_{dirMN}|^2$.

5. An apparatus comprising a computer and a computer program product, said computer program product being embodied in computer code and being characterized by computer program logic for enabling said computer to process output from at least one acoustic vector sensor, said computer code being executable by said computer so that, in accordance with said computer program logic, said computer performs steps including:

calculating the modal beam amplitude response ($b_{mn}(\theta,\phi,\theta_1,\phi_1)$) for each of plural modal beams, said calculating of the modal beam amplitude response including using the matrix-product equation $b_{mn}=w_{mn}^{\dagger}d$, wherein d is the data vector representing signals from said at least one acoustic vector sensor, (m) is the vertical order of each said modal beam amplitude response, (n) is the horizontal order of each said modal beam amplitude response, and $w_{mn}(\theta,\phi,\theta_1,\phi_1)$ is the following set of modal weighting vectors:

$$w_{mnx}=\cos(m\theta-(m-1)\theta_1)\cos(n\phi-(n-1)\phi_1)$$

$$w_{mny}=\cos(m\theta-(m-1)\theta_1)\sin(n\phi-(n-1)\phi_1)$$

$$w_{mnz}=\sin(m\theta-(m-1)\theta_1:$$

calculating the directional beam amplitude response ($b_{dirMN}$) for all of said modal beams, said calculating of the directional beam amplitude response including using the summation equation $$b_{dirMN}=\sum_{mn} b_{mn},$$

wherein $b_{dirMN}$ is the sum of all said modal beam amplitude responses up to selected maximum vertical order (M) and selected maximum horizontal order (N).

6. The apparatus of claim 5, said computer code being executable by said computer so that, in accordance with said computer program logic, said computer performs steps further including:

calculating the modal beam intensity response ($I_{mn}$), said calculating of the modal beam intensity response including using the absolute-value-squared equation $I_{mn}=|b_{mn}|^2$;

calculating the directional beam intensity response ($I_{dirMN}$), said calculating of the directional beam intensity response including using the absolute-value-squared equation $I_{dirMN}=|b_{dirMN}|^2$.

* * * * *